US008380589B2

(12) United States Patent
Deane et al.

(10) Patent No.: US 8,380,589 B2
(45) Date of Patent: Feb. 19, 2013

(54) METHODS AND APPARATUS FOR REAL ESTATE FORECLOSURE BID COMPUTATION AND PRESENTATION

(75) Inventors: Beverly Floyd Deane, Raleigh, NC (US); Karen Yandle Carpenter, Clayton, NC (US); Allison Nicole Pope, Raleigh, NC (US); Jill Alese Cleary, Raleigh, NC (US); Robert Chris Krause, Wake Forest, NC (US); Daniel Earl Williamson, Raleigh, NC (US)

(73) Assignee: GE Mortgage Holdings, LLC, Raleigh, NC (US)

( * ) Notice: Subject to any disclaimer, the term of this patent is extended or adjusted under 35 U.S.C. 154(b) by 2315 days.

(21) Appl. No.: 10/449,258

(22) Filed: May 30, 2003

(65) Prior Publication Data
US 2004/0243507 A1 Dec. 2, 2004

(51) Int. Cl.
*G06Q 40/00* (2006.01)
(52) U.S. Cl. .......................... 705/30; 705/35
(58) Field of Classification Search ............... 705/30–40
See application file for complete search history.

(56) References Cited

U.S. PATENT DOCUMENTS

| | | | | |
|---|---|---|---|---|
| 5,930,775 A | * | 7/1999 | McCauley et al. | 705/36 R |
| 7,035,820 B2 | * | 4/2006 | Goodwin et al. | 705/37 |
| 7,379,912 B1 | * | 5/2008 | Camin et al. | 705/38 |
| 2002/0035520 A1 | * | 3/2002 | Weiss | 705/27 |

OTHER PUBLICATIONS

RealtyTrac Launches Website with Data on Distressed Properties, Aug. 7, 2000, National Mortgage News, v24, n46, p. 32.*

* cited by examiner

*Primary Examiner* — Ryan D Donlon
*Assistant Examiner* — Seth Weis
(74) *Attorney, Agent, or Firm* — Law Offices of Peter H. Priest, PLLC

(57) ABSTRACT

Techniques and systems for generating and presenting foreclosure bid instructions are described. A connection to a foreclosure bid computer is established through a data processing network. Loan identification information is received from the user and foreclosure bid information relating to the loan is retrieved. Loan information is received from the user relevant to generating a foreclosure bid for a property. The information received from the user, as well as the retrieved foreclosure bid information, is processed in order to compute a foreclosure bid amount calculated to yield appropriate net proceeds from the sale of the property. A set of foreclosure bid instructions including the computed bid amount is generated, and presented to the user over a data processing network interface.

18 Claims, 12 Drawing Sheets

FIG. 6

300 e-bid - Foreclosure Bidding Information - Microsoft Internet Explorer provided by GE Mortgage

*We bring good things to life.*

GE Mortgage Insurance e-Bid - Foreclosure Bidding Information

Log off — 602

604 Certificate Number: [ ]    Search — 606

608
```
Certificate Number:  1
% Coverage:          17%
Borrower Name:       Parker, George
CoBorrower Name:     Parker, Betty
Property Address:    4837 Grimes St.
                     Pleasantville, IA 50225
```

610
```
Loan Due Date:              06/01/2002
UPB:                        $42,046
Lender Loan Number:         2
Scheduled Foreclosure Sale Date: 05/12/2003
```

616
Please enter the following information.
If Total Debt is unknown, please enter 119% of UPB
which was calculated at $50,034 based on last reported UPB.

612 Current Property Value: [80000]  (in whole US dollars)
Total Debt (include all fees): [42,046]  (in whole US dollars)

618 — [Submit]   614

Copyright ©2002, GE Mortgage Insurance

```
e-bid - Bid Instructions - Microsoft Internet Explorer provided by GE Mortgage    _ □ ×
File  Edit  View  Favorites  Tools  Help
← Back  ·  → · ⊗ ⬚ ⌂ | ⓠ Search  ⊡ Favorites  ⓙ Media  ⌐ | ⬚ · ⬚ W · ⬚
Address  ⬚ http://dev-ebid.gecmc.ge.com/default.asp                    ▼  ⌐ Go   Links »
```

| Log off | e-Bid - Bid Instructions |
|---|---|

802

Certificate Number: [    ]  [Search]

Certificate Number: 1
% Coverage: 17%
Borrower Name: Parker, George
CoBorrower Name: Parker, Betty
Property Address: 4837 Grimes St.
Pleasantville, IA 50225

Loan Due Date: 06/01/2002
UPB: $42,046
Lender Loan Number: 2
Scheduled Foreclosure Sale Date: 05/12/2003

Current Property Value: $40,000
Total Debt (Include all fees): $50,000

804 — Due to variance between the current value and the original appraised value, please advise if the appraiser/broker indicated any of the following.

806 — ☑ Property Damage (beyond normal wear and tear)
808 — ☐ Depreciating Area
810 — ☐ Unknown (if no reason indicated for lowered value)
812 — ☐ Other Comments (max 250 char):

814 — [                                          ]

816 — [Submit]

FIG. 10

300 e-bid - Bid Instructions - Microsoft Internet Explorer provided by GE Mortgage

File  Edit  View  Favorites  Tools  Help

Address http://dev-ebid.gecmc.ge.com/default.asp

Log off                                e-Bid - Bid Instructions

1002                    Certificate Number: [        ]  [Search]

Certificate Number:  1
% Coverage:  17%
Borrower Name:  Parker, George
CoBorrower Name:  Parker, Betty
Property Address:  4837 Grimes St.
                   Pleasantville, IA 50225

Loan Due Date:  06/01/2002
UPB:  $42,046
Lender Loan Number:  2
Scheduled Foreclosure Sale Date:  05/12/2003

Current Property Value:  $40,000
Total Debt (include all fees):  $50,000

Due to variance between the current value and the original appraised value, please advise if the appraiser/broker indicated any of the following.

☐ Property Damage (beyond normal wear and tear)
1004 ☑ Depreciating Area
☐ Unknown (if no reason indicated for lowered value)
☐ Other Comments (max 250 char):
[                                                                    ]

[Submit]

Done                                                    Local Intranet

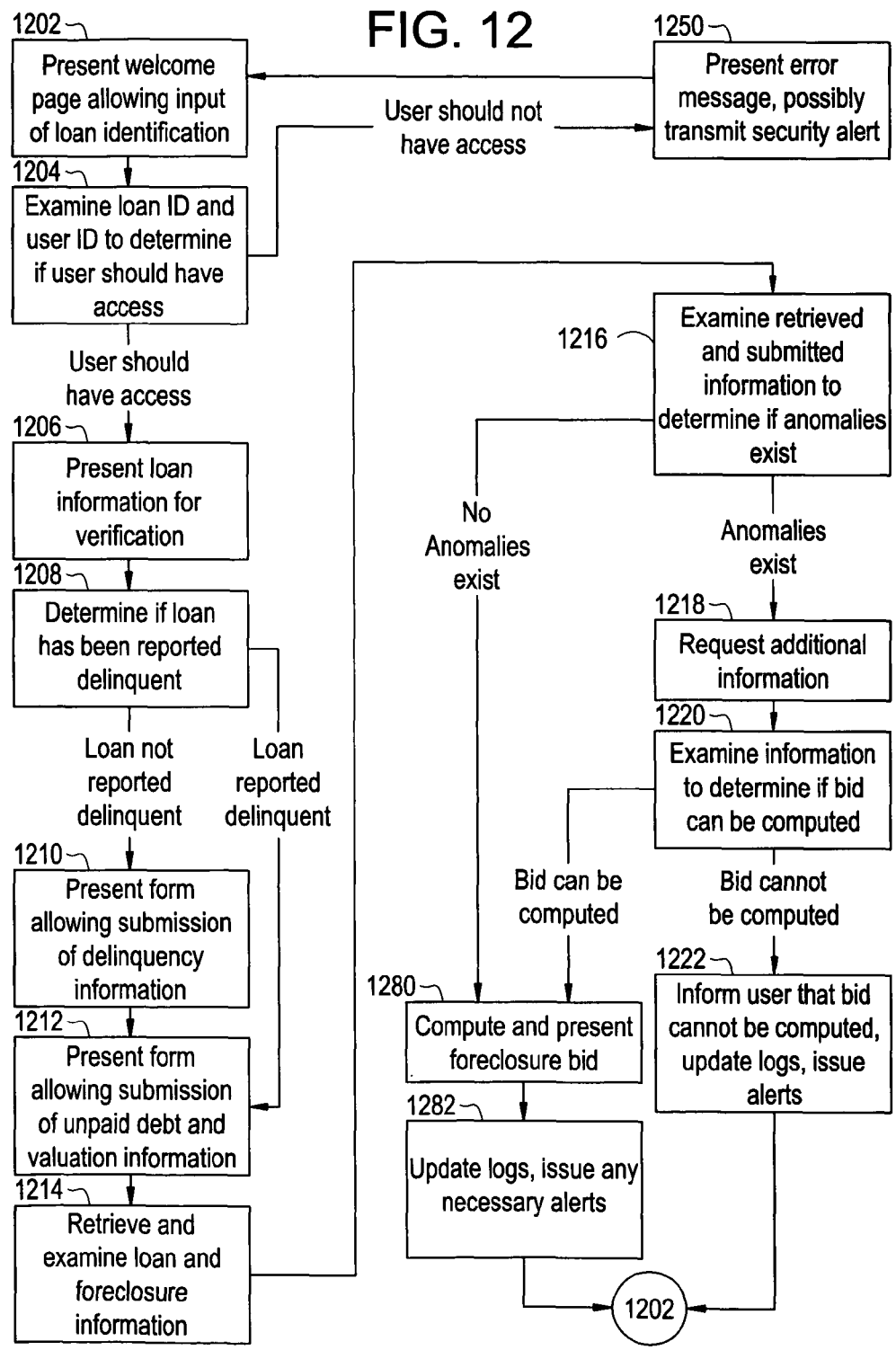

METHODS AND APPARATUS FOR REAL ESTATE FORECLOSURE BID COMPUTATION AND PRESENTATION

BACKGROUND OF INVENTION

The present invention relates generally to improved techniques and systems for automating the computation of bids for mortgage foreclosure sales. More particularly, the invention relates to advantageous techniques for electronic transmission of foreclosure sale bid instructions using a publicly accessible data transmission network such as the Internet while providing security to prevent unauthorized access to private data.

Many real estate loans employ mortgage insurance in order to allow a borrower to purchase property using a lower down payment than would otherwise be required. A mortgage insurance policy is purchased to protect the servicing entity servicing the mortgage. If a borrower defaults on an insured loan and the default is followed by a covered event which causes a loss to the mortgage servicing entity, the mortgage servicing entity may submit to a mortgage insurer a claim for payment under the terms of the insurance policy. One of the most important events giving rise to a claim is foreclosure and auction sale of the property. The foreclosure process typically ends with an auction sale, with the title to the property being transferred to the auction buyer and the auction proceeds being transferred to the holder of the mortgage. If the auction proceeds are sufficient to satisfy the mortgage, no payment is due under the mortgage insurance policy. Typically, however, the foreclosed property sells for less than the total debt on the mortgage. The total debt includes the unpaid principal balance, as well as expenses incurred and fees charged by the servicing entity, such as interest accruing after default, late payment charges, and expenses incurred by the servicing entity during the foreclosure process.

When the foreclosed property sells for less than the total debt, the servicing entity suffers a loss which is covered, fully or in part, by the mortgage insurance policy. The payment made under the policy typically covers the difference between the amount realized at the foreclosure sale and the amount covered by the policy, allowing for documented expenses as described in the master policy agreement between the servicing entity and the mortgage insurer. If the property is purchased by the servicing entity, the servicing entity typically files a claim to the mortgage insurer for an amount equal to the servicing entity's loss, limited by the amount of coverage.

The foreclosure bid by the servicing entity should be calculated to realize as much money as possible for the property, while allowing third parties to purchase the property if they offer an appropriate price. If the bid is properly calculated, an interested third party will be able to obtain the property for a fair price, and the servicing entity will not need to maintain and resell the property. If the foreclosure bid is inadequate, the servicing entity risks receiving less money than could be realized by purchasing and reselling the property. If the foreclosure bid is excessive, the servicing entity risks precluding third parties from buying the property, and being forced to resell the property for less than could have been obtained if a third party had been able to purchase the property and relieve the servicing entity of maintenance and resale expenses.

Because the mortgage insurer covers losses resulting in shortfalls of the net sale price of the property, many insurers provide bidding instructions for servicing entities. These instructions are calculated to produce a bid that will either obtain the property for the mortgage servicer at a reasonable price in relation to its value, or alternatively to allow an interested third party to obtain the property at a reasonable price. The instructions need to meet state requirements, and to take into account the current value of the property, the amount owing on the property, the costs and fees that are incurred during delinquency of the mortgage and the costs incurred in completing the foreclosure. Preferably, the process of producing the instructions also takes into account the possibility that the value of the property is below the original appraised value at the time the mortgage was secured, and allows for the investigation of the circumstances leading to the decrease in value.

Mortgage insurers often provide services to many clients, distributed over a wide geographic area. When a client needs to make a foreclosure bid, it naturally wishes to receive bidding instructions that are delivered promptly, and are unambiguous and easy to understand. In addition, it would be highly advantageous if the process of generating bids could be as flexible as possible, so that the bid amount could take into account the specific circumstances of the particular foreclosure sale under consideration. Prior art techniques for providing foreclosure bidding instructions include providing generalized paper instruction cards to clients. These cards may include a bidding chart, which may be consulted by the user in order to examine bidding rules for a particular state. The chart may include a percentage, so that the user can determine a bid amount by multiplying the percentage by the current value. In making a bid, the user also takes the total debt, including expenses and fees, into account. For example, if the percentage is 90%, the user may use this percentage to estimate the value of the property, and employs this estimated value in making a bid. In making a bid, the user also takes into account the total debt. For example, if a third party is bidding at the auction of a property whose value is $80,000, and the total debt is $50,000, the mortgage insurance client might bid up to $50,000 because that would be the amount needed to satisfy the mortgage.

Such generalized paper instructions may be misinterpreted by a user, and also require computation by the user, raising the possibility of errors. In addition, the use of such instructions does not provide any instantaneous and automatic way of reporting anomalies, such as unusual declines in the property value. Alternative techniques involve voice response telephone systems that provide instructions, but these may be inconvenient for a user.

Many mortgage insurance clients and mortgage insurers have access to data processing systems and networks with substantial capacity and capability, and infrastructure exists for easy and secure information transfer between mortgage insurance clients and mortgage insurers. There exists, therefore, a need for automated systems and techniques for providing foreclosure bid instructions that are clear and unambiguous, in a way that is easy for a user to understand, that provides flexibility in the computation of instructions and that includes an automatic and convenient way to report relevant information to a mortgage insurer.

SUMMARY OF INVENTION

A system for computing and presenting a foreclosure bid for use by a holder of a secured loan at a foreclosure sale of property securing the loan comprises a foreclosure bid information database for receiving, storing and maintaining foreclosure bid information applicable to foreclosure sales of property. The foreclosure bid information is relevant to determination of a foreclosure bid likely to yield appropriate net proceeds from the sale of the property, taking the current value and total debt into account. The system further includes a foreclosure bid manager accessible to a user through a publicly available data processing network. The foreclosure bid manager receives inputs from a user relating to a property for which a foreclosure sale is to be held and employs information submitted by the user and stored in the foreclosure bid information database to compute an appropriate bid for the property, to compile a set of bid instructions including a minimum price at which the property is to be allowed to be sold, and to present the bid instructions to the user. The minimum price included in the instructions is a price calculated to yield an appropriate amount of net proceeds from the property, considering the value of the property and the total debt.

A process of foreclosure bid generation and presentation according to another aspect of the present invention comprises establishing a connection to a user computer through a data processing network, receiving loan identification information from the user, retrieving foreclosure bid information relating to the loan and receiving loan information from the user relevant to generating a foreclosure bid for a property securing the loan. The process further includes processing the information received from the user, as well as the retrieved foreclosure bid information, in order to compute a foreclosure bid amount calculated to yield an appropriate amount of net proceeds from the sale of the property, considering the value of the property and the total debt, including fees and expenses. The process further includes the generation of a set of foreclosure bid instructions for bidding for the property at a foreclosure sale, and presenting the set of foreclosure bid instructions to the user over a data processing network interface. The set of foreclosure bid instructions includes the computed foreclosure bid amount.

A more complete understanding of the invention, as well as further features and advantages of the invention, will be apparent from the following Detailed Description and the accompanying drawings.

BRIEF DESCRIPTION OF DRAWINGS

FIGS. 3-11 illustrate various hypertext pages presented by a foreclosure bid manager to allow collection of user inputs and presentation of data according to an aspect of the present invention; and FIG. 12 illustrates a process of foreclosure bid computation and presentation according to an aspect of the present invention.

DETAILED DESCRIPTION

Figure 1:
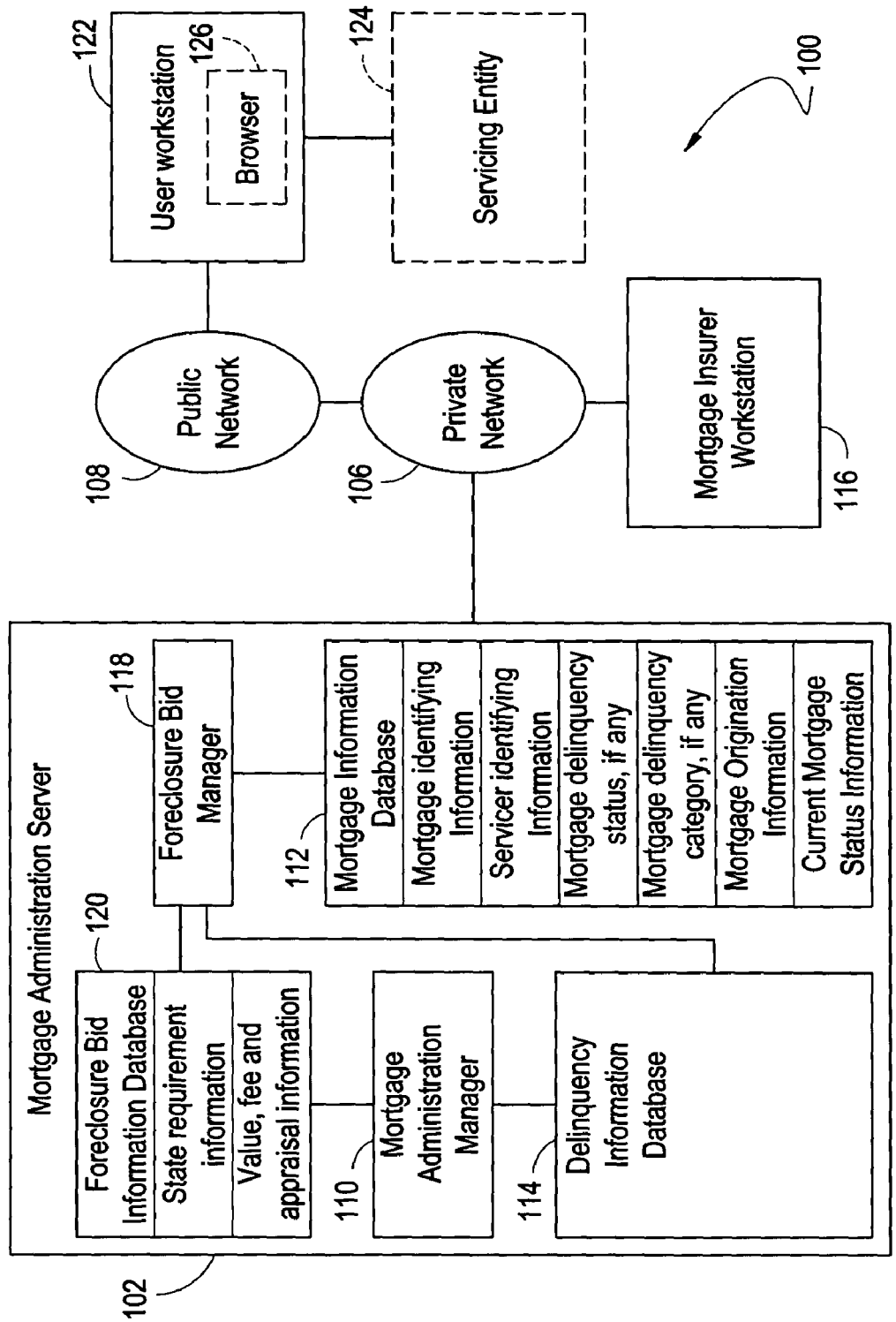
FIG. 1 illustrates an electronic system for computing a foreclosure bid and providing it to a user according to an aspect of the present invention.

FIG. 1 illustrates a foreclosure bid generation and display system 100 according to an aspect of the present invention. The system 100 comprises a mortgage administration server 102, suitably operated by or for a mortgage insurer. The server 102 is preferably connected to a private network 106, and the private network 106 is in turn connected to a publicly accessible network 108, which may suitably be the Internet.

The server 102 hosts a mortgage administration manager 110, allowing review and updating of information stored in a mortgage administration database 112 and a delinquency information database 114. The mortgage information database 112 preferably includes information relating to each mortgage covered by a certificate of mortgage insurance. The mortgage insurance information for each mortgage covered by a certificate is preferably stored in the form of a database entry, and each entry preferably includes relevant information, such as identifying information relating to the mortgage. This information may include names of borrowers, address of property and mortgage insurance certificate number. The certificate number may suitably be used as a convenient index to the database 112, and is associated with a certificate of insurance previously issued to a servicing entity. A certificate having a unique certificate number is issued for each insured loan, and additional information relating to the loan is associated with this certificate in the database 112. This additional information may include identification of the mortgage servicer and mortgage origination information relating to conditions prevailing at the time the mortgage was initially obtained. These conditions may include original appraisal, original loan amount, interest rate and so on. Other information may include current information, such as amount owing, present value and the like. Still other information may suitably include delinquency status information and delinquency category information, provided that a delinquency has been reported.

The server 102 also suitably hosts a delinquency information database 114, storing delinquency status for each mortgage that has been reported delinquent by a servicer. Each entry in the database 114 suitably includes information such as the certificate number, the unpaid balance, whether or not a foreclosure sale has been scheduled, date of a foreclosure sale, and so on.

The mortgage administration server 102 may suitably be accessible, for example, using a mortgage insurer workstation 116 which may be operated by an employee of the mortgage insurer for whom the mortgage administration server 102 is maintained. A user of the workstation 116 can invoke the mortgage administration manager 110 to store, retrieve and update information in the databases 112 and 114. In addition, the mortgage insurer workstation 116 may be employed to gain access to a foreclosure bid manager 118 which is used to process mortgage and property information for a property covered by a mortgage insurance policy, and to generate instructions for bidding on the property at a foreclosure sale. The foreclosure bid manager 118 is preferably a software program or set of programs running on the server 102. The foreclosure bid manager 118 has access to the mortgage information database 112 and the delinquency information database 114, and can access, store and update information in these databases.

In addition, the server 102 suitably hosts a foreclosure bid information database 120. The bid information database suitably includes information relating to the rules and laws of various jurisdictions, such as U.S. states, that govern foreclosure bidding. The bid information database 120 also includes information useful for dealing with various possibilities affecting a property and a mortgage on the property. For example, by the time a mortgaged property is subject to a foreclosure sale, various fees and expenses will have been incurred. These expenses may be expressed as a percentage of the unpaid principal balance, and added to the unpaid principal balance to obtain the total debt. For example, an expected amount for fees and expenses may be 15-20% of the unpaid principal balance, so that the total debt would be 115%-120% of the unpaid principal balance. The expected amount of these expenses may vary from one state or geographic region to another, and the database 120 may include suitable percentage values for each area or region. Alternatively, an estimated expense amount for each mortgage may be stored in a suitable repository such as the delinquency information database 114 or the mortgage administration database 112, to be used in case of default or foreclosure.

Other useful information may be stored in the database 120, such as the deviation from original appraised value that may be allowed before investigation is required, and rules to be followed when the allowable deviation is exceeded. This information, together with regional variations, may suitably be stored in the database 120 in order to provide a convenient repository for such data.

The mortgage information database 112 and delinquency information database 114 may suitably be updated periodically with delinquency information, in order to provide current information for use with various operations, including foreclosure bid computation. Each entry in the databases 112 and 114 preferably includes a notation as to whether or not the associated mortgage has been reported delinquent.

The foreclosure bid manager 118 is preferably accessible to customers of the mortgage insurer for whom the system 100 is maintained. These customers are typically mortgage servicing entities who hold mortgages insured by the mortgage insurer. Employees of a servicing entity may suitably operate workstations maintained by their employer. FIG. 1 shows such a workstation 122, which is exemplary of a plurality of such workstations. Each servicing entity may operate a plurality of such workstations, and the system 100 may suitably be accessible to a plurality of servicing entities, each operating a plurality of workstations. Each employee may use such a workstation to begin and maintain a properly secured communication session with the server 102, typically conducted through the public network 108, which allows a secure and authenticated connection to the private network 106. Once a properly authenticated user has invoked the foreclosure bid manager 118, he or she is preferably allowed to obtain information relating to mortgages held by the servicer with whom he or she is associated. For example, each entry for a mortgage certificate issued to XYZ Bank may include an identification of XYZ Bank as the servicer, and users associated with XYZ Bank will be only able to view or work with entries including such identification. Alternatively, each certificate number may include information identifying the servicer to whom the certificate was issued, and security protocols may be maintained to restrict access to users who are associated with certificate numbers for mortgages that they are allowed to view.

When a user at the workstation 122 wishes to obtain foreclosure bid instructions for a particular mortgage, he or she may suitably use the workstation 122 to obtain a connection to the server 102. This action may be undertaken by entering a uniform resource locator (URL) into a browser such as the browser 126. The foreclosure bid manager 118 is then invoked and requests authenticating information. Once authenticating information is provided, the user may submit an identifier, such as the mortgage certificate number, for the mortgage for which the user wishes to obtain a bid. The certificate number is examined to determine if it is associated with an active mortgage. If not, an error message is generated and the user is given an opportunity to reenter the certificate number or to search in another way, for example, by selecting from a list. If appropriate, a message is generated to contact the appropriate personnel at the mortgage insurer to perform an appropriate investigation to determine the status of the certificate number, for example, if it exists but is inactive, or if the mortgage has been managed in some other way.

Upon submission of a valid and active certificate number, the foreclosure bid manager 118 retrieves the mortgage information from the mortgage information database, uses the information retrieved from the mortgage information database 112 to identify relevant information to be retrieved from the delinquency information database 114 and the foreclosure bid information database 120, and uses the retrieved information, together with inputs from the user, to generate bidding instructions. The foreclosure bid manager 118 may suitably present a series of interactive displays, such as html pages displayed through an html browser, to allow a user to make entries and view displayed data. Of course, other display and data entry techniques may also be employed in addition to or as alternatives to those particularly described herein. For example, it will be recognized that for someone physically attending a live auction, a connection to the system 100 using a personal digital assistant or other handheld computing device with telephone or wireless capability might be desirable. The display on such a device might be quite different from those discussed herein, as a result of the limitations of the device, such as a small display and the desire to use a touchscreen display to enter data, rather than providing a separate keyboard.

Each servicing entity may suitably have an account number or other identifier, used to insure the security of information hosted by the server 102. Each mortgage insurance certificate and its associated information may suitably be associated with the identifier of the entity servicing the mortgage for which the certificate was issued. Security may be provided through the issuance of a username and password for each of the users having access to the bid foreclosure manager 118. Each username given to an employee of a particular servicing entity is preferably associated with the identifier of the entity, so that each request for information may be checked to determine that the requester should be allowed access to the information. In this way, an entry can be identified with the entity servicing the mortgage described in the entry, and restricted to authorized users such as users associated with the servicing entity or with the insurer by or for whom the system 100 is operated. Such restrictions protect the privacy of borrowers and the proprietary information of mortgage servicing entities.

Once the user has submitted proper identifying information such as a username and password, he or she may be presented with an initial welcome page, calling for submission of a certificate number.

Upon a user entry of a certificate number, or other entry or selection made in order to retrieve an entry, the foreclosure bid manager 118 retrieves the entry information from the mortgage information database 112 and uses this information to construct and display a hypertext page showing relevant details of the entry. The relevant details suitably include the certificate number, the amount of mortgage insurance coverage, typically expressed as a percentage, the names of the borrower and coborrowers, if any, and the address of the property for which the mortgage was issued. The foreclosure bid manager 118 also examines the entry to determine if the mortgage has been reported delinquent. If not, the delinquency must be reported to the mortgage insurance company and the foreclosure bid manager 118 presents a page allowing the user to enter delinquency information. This information suitably includes the loan due date, the unpaid principal balance, the foreclosure sale date and any identifying information used by the lender, such as a lender loan number. After the delinquency information is submitted, the mortgage information database 112 is updated. In addition, a separate delinquency report is transmitted to an appropriate data repository maintained by the mortgage insurance company, for example the delinquency information database 114. The foreclosure bid manager 118 then presents a new hypertext page allowing the user to present information required for computing a bid. This information may suitably include the value of the property and the total debt including all fees and expenses. If the exact total debt is not known, the foreclosure bid manager 118 may suitably compute a percentage of the unpaid principal balance to be used as an estimate of the total debt. For example, an estimate may be made by taking a percentage of the principal balance. A percentage associated with the geographic region of the mortgaged property may suitably be retrieved from the bid information database 120 and used to compute an estimate of the total debt. This estimate is presented to the user, so that the user can simply enter this value, if desired, or alternatively can enter a more accurate figure, if this is known.

Once the property value and total debt amount have been entered, the foreclosure bid manager 118 then examines the entered property value and compares this value against an original appraised value stored in the mortgage information database. This value is compared against predetermined parameters, suitably stored in the foreclosure information database 120. These parameters may be expressed in terms of percentages. If the property value does not differ from the original value by more than the deviation defined by the parameters, a set of foreclosure bid instructions is prepared, based on the regulations imposed by the jurisdiction controlling the sale, the value of the property and the total debt on the loan. The issuance of the bid instructions is logged, suitably in the foreclosure bid information database 120, and may also be stored in the mortgage information database 112 and the delinquency information database 114. In addition, the bid information is displayed to the user in html format through the browser 126. In addition, a message may be sent to a responsible party at the mortgage insurer, indicating that foreclosure bid instructions were issued and describing the instructions.

If the property value differs too greatly from the original appraised value, the foreclosure bid manager 118 displays additional hypertext pages requesting explanation of the discrepancy, and may make appropriate notations and send appropriate messages indicating the existence of such a discrepancy. In addition, if no property value is submitted, it may be undesirable or even impossible to provide a set of bid instructions until the property value is determined. If the user has not submitted a property value, but a predetermined period of time such as 15 days remains before the scheduled sale, the foreclosure bid manager 118 may simply request the user to obtain a property appraisal and submit the bid at a later date. If the time remaining is shorter than this predetermined period, the foreclosure bid manager 118 examines the database 120 to determine if the state having jurisdiction requires an appraisal. If so, no bid can be issued until an appraisal is performed. If the state does not require an appraisal, it may be possible to estimate the value of the property using a market index value. If this is the case, the property value is estimated using the index value. If it is not possible to estimate the value of the property using a market index value, a message is displayed to the user indicating that no bid can be issued. In each of the above cases, appropriate data repositories, such as the foreclosure bid information database 120 and the delinquency information database 114 may be updated to reflect the determination that was made., and appropriate messages may be sent to responsible parties at the mortgage insurer.

If a property value has been provided, but this value differs excessively from the original appraised value found in the mortgage information database 112, the foreclosure bid manager 118 displays additional hypertext pages requesting explanation of the discrepancy, and may make appropriate notations and send appropriate messages indicating the existence of such a discrepancy. Some conditions, typically a damaged condition of the property, are such that the mortgage insurance issuer cannot provide bidding instructions. The reason for this rule is that mortgage insurance only insures against certain shortfalls between the property value and the amount owing. The shortfalls insured against are those resulting from marketing conditions, and shortfalls due to property damage are outside the scope of coverage. If property is damaged, the mortgage insurer will still pay for valuation shortfalls that are covered by the insurance, but shortfalls due to damage are the responsibility of the servicing entity.

Other conditions, such as the fact that the property is in a depreciating area, fall within the risk covered by mortgage insurance, so that it is appropriate for the insurer to provide bidding instructions. In such a case, the foreclosure bid manager 118 stores such information in the foreclosure bid information database 120 and the delinquency information database 114. The foreclosure bid manager 118 preferably adjusts the bid amount, suitably according to adjustment information stored in the database 120 or according to the property value previously entered by the user. The reason for such adjustments is to allow the bid to be set properly in light of prevailing conditions, so that a third party offering an appropriate price will be able to purchase the property.

Other conditions call for investigation, and may or may not relieve the insurer of the responsibility to provide bidding instructions. For example, if the reason for a large deviation between the original appraisal and the present value is not known, the size of the deviation, combined with the lack of an immediately apparent reason for the deviation, may be an indication that the original appraisal was inappropriately high. Such an appraisal may have been a result of fraud calling for investigation. In such a case, an alert may be sent to appropriate persons having responsibility to investigate the matter. In addition, the foreclosure bid manager 118 may suitably refuse to provide bid instructions until further explanation is provided. The database 120 may suitably include rules indicating the proper course of action under these circumstances, with the foreclosure bid manager 118 selecting appropriate rules depending on the particular situation indicated by the user entries.

Figure 2:
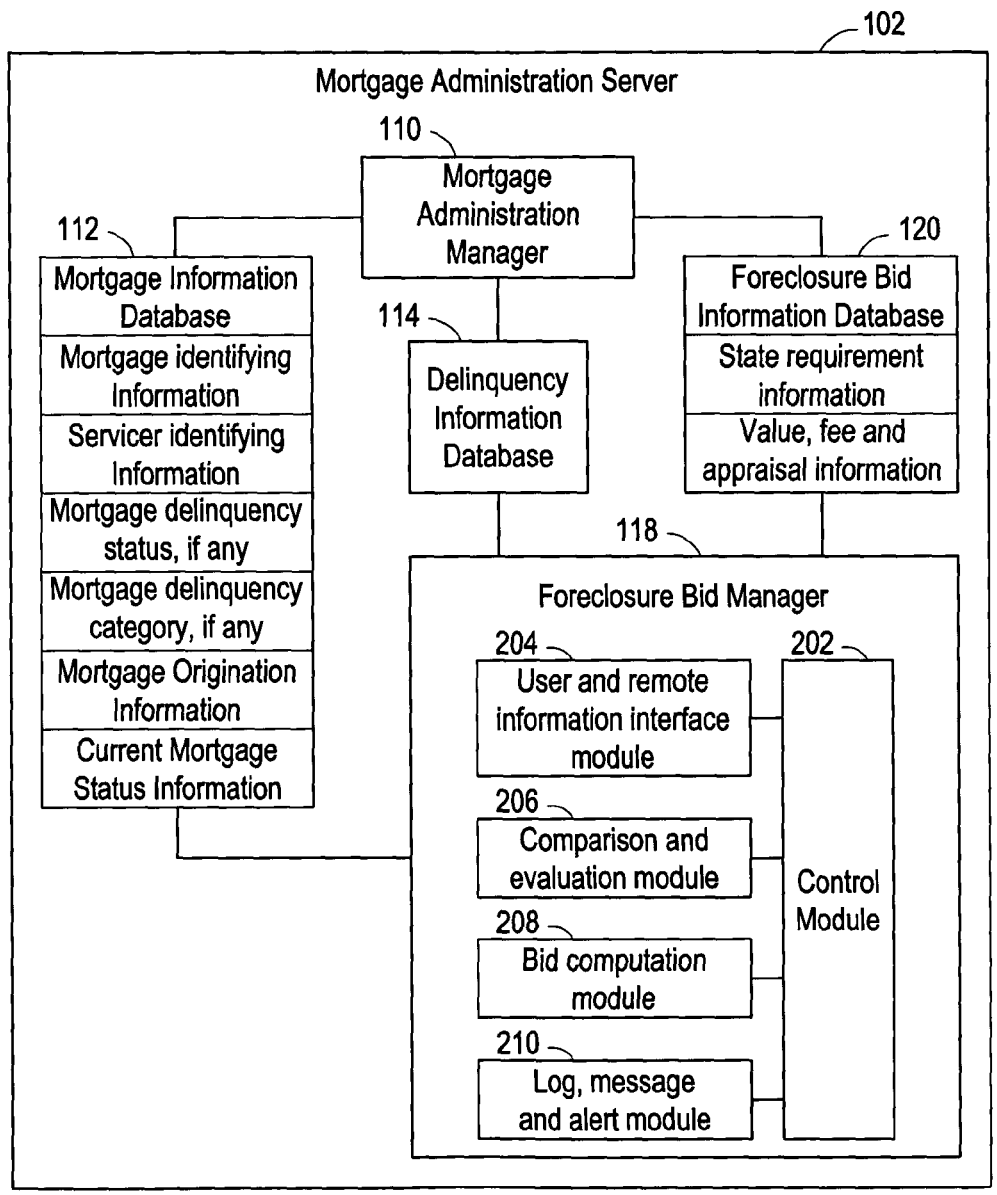
FIG. 2 illustrates a foreclosure bid manager according to an aspect of the present invention.

FIG. 2 illustrates the mortgage administration server 102 in greater detail, showing the mortgage administration manager 110, mortgage information database 112, delinquency information database 114, foreclosure bid manager 118 and foreclosure bid information database 120. The various applications and databases are all shown on a single server 102 for convenience, but it will be recognized that these elements need not all be hosted on the same server, but may be distributed in any number of ways. The mortgage administration manager 110, mortgage information database 112 and delinquency information database 114 all operate to create and maintain information useful in generating foreclosure bids, but they typically have applications beyond this function.

The foreclosure bid manager 118 suitably includes a plurality of modules, including a control module 202, a user and remote information interface module 204, a comparison and evaluation module 206, a bid computation module 208 and a log, message and alert module 210. The control module 202 manages the functions of the other modules 204-210, invoking an appropriate module when needed to carry out a desired function. Typically, when the foreclosure bid manager 118 is invoked, the control module 202 invokes the user and remote information interface module 204 in order to receive user inputs and retrieve information as needed. When a user submits identifying information for a loan, the module 204 examines appropriate information repositories such as the mortgage information database 112 in order to determine whether the user is authorized to retrieve the desired information and to retrieve and display the information. When the user submits further information in order to prepare a bid, the control module 202 passes this information to the module 204 and also invokes the comparison and evaluation module 206 in order to determine the appropriate course of action. The user and remote information interface module 204 retrieves necessary information from the databases 112 and 114 and passes this information, along with information received from the user, to the comparison and evaluation module 206. The comparison and evaluation module 206 determines if it is appropriate to compute a bid, by reviewing whether delinquency information has been reported for the loan and by determining whether various state requirements have been met. For example, some states require that an appraisal be performed before a foreclosure sale, and the comparison and evaluation module 206 determines whether this requirement is applicable and, if so, whether an appraisal has been conducted as required. If not, the comparison and evaluation module 206 generates an appropriate alert and furnishes it to the user and remote information interface module 204 to alert the user, and may also furnish it to the log, message and alert module in order to alert a responsible party associated with the mortgage insurer. In addition, the comparison and evaluation module 206 examines information relating to the condition of the property, for example the fact that the property is in a damaged condition, in determining whether a foreclosure bid can be computed, and invokes the log, message and alert module 210 in order to make an appropriate notation indicating whether or not a bid can be issued.

Once the comparison and evaluation module 206 has made appropriate determinations, it passes control back to the control module 202, which then invokes the bid computation module 208. The bid computation module 208 examines the foreclosure bid information database 120 and the mortgage information and delinquency information databases 112 and 114, respectively, and computes an appropriate bid using rules and conditions retrieved from the various databases and from the information submitted by the user. Once the bid has been computed, the bid computation module invokes the user and remote information interface module 202 in order to present bid instructions to the user, and invokes the log, message and alert module 210 to store the bid instructions in an appropriate repository, such as the delinquency information database 114.

Communication between the user and the foreclosure bid manager 118 is preferably conducted through the display of a succession of html browser displays and the submission of information by the user employing fields provided in such displays. FIGS. 3-11 illustrate a representative sequence of displays that may suitably be employed to receive information from the user and provide the user with requests for further information, and with foreclosure bid instructions.

Figure 3:
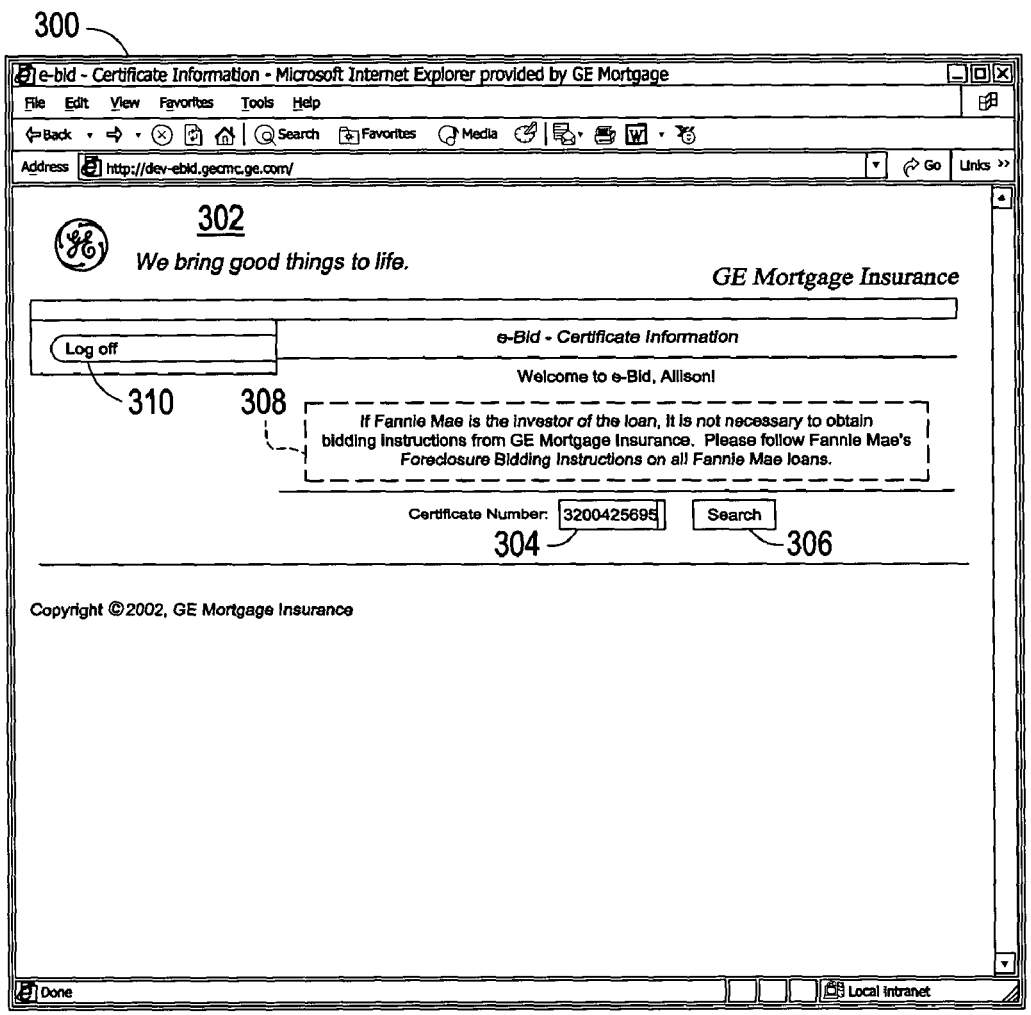

FIG. 3 illustrates an html browser window 300, displaying an html page 302, suitably presented by a foreclosure bid manager such as the manager 118. The page 302 appears after a user has both invoked the foreclosure bid manager by entering a uniform resource locator of an introductory page and has submitted identifying information such as a username and password. The page 302 includes a certificate number field 304, to allow entry of a mortgage insurance certificate number, and a "submit" button 306. The page 302 also includes a general instruction field 308, highlighting special instructions to be followed in cases where the Federal National Mortgage Authority (Fannie Mae) is the investor for the mortgage. The page further includes a "Logoff" button 310, allowing the user to close the connection to the foreclosure bid manager 118. Once logoff has been accomplished, information cannot be retrieved or submitted without providing authenticators such as a username and password.

Typically, a user enters a value in the certificate number field 304 and activates the "submit" button 306, typically by clicking the button 306 with a mouse pointer. If the certificate number is invalid, an error message may be presented and the user given another opportunity to present a valid certificate number. The error message may include an additional hypertext link, which may be activated by the user in order to gain access to a more powerful search mechanism, in order to search using information about the loan or property. If a valid number is found, the certificate is retrieved and examined and relevant information is presented to the user.

Figure 4:
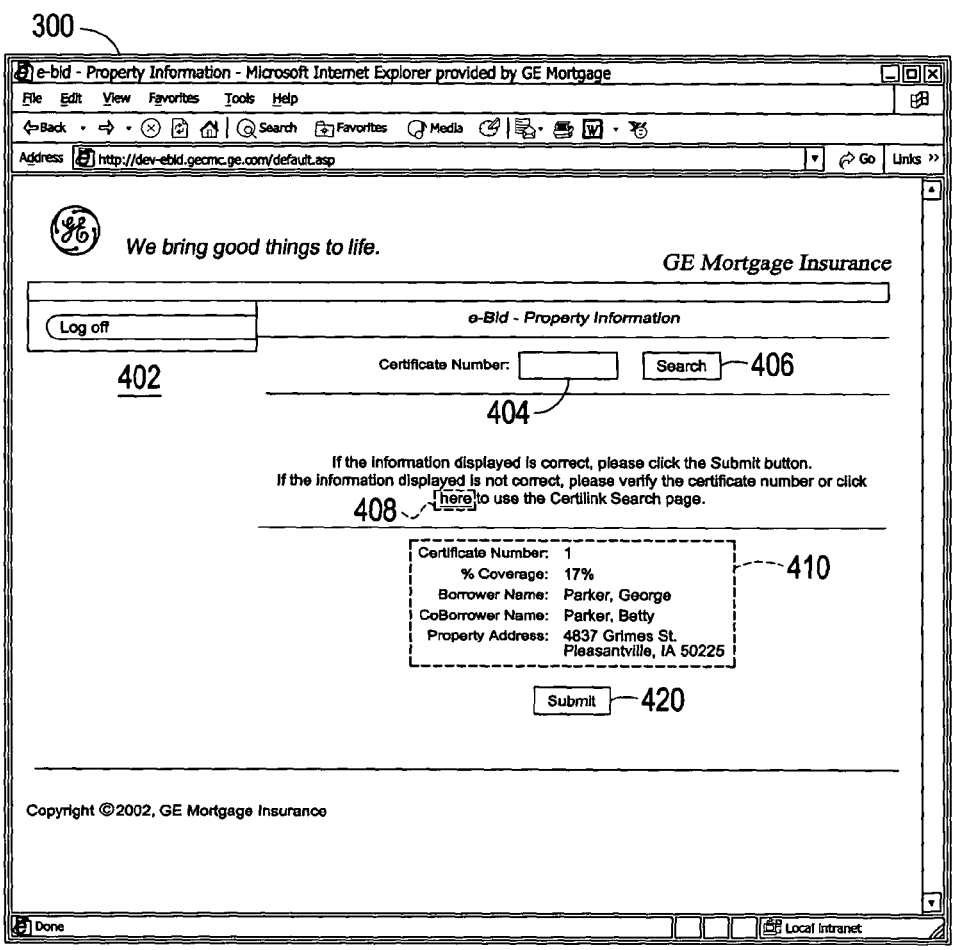

FIG. 4 illustrates the browser 300, displaying an html page 402. The page includes a certificate number field 404 and a "search" button 406. Activating the "search" button searches for the number entered in the field 404. Alternatively, the user may click on the hypertext link 408, in order to gain access to a more powerful search mechanism, in order to search using information about the loan or property. The page 402 also includes an information display area 410, which presents information about the borrower or borrowers, the property, the certificate number and the coverage amount. The coverage amount is presented in terms of percentages. A "submit" button 420 allows the user to indicate that the certificate for which information is presented is the one desired and to proceed to work with the information. When the user activates the "submit" button 420, the foreclosure bid manager 118 checks the mortgage information database 112 and the delinquency information database 114 to determine if the loan has been reported delinquent. If the loan has been reported delinquent, a display is presented to allow the user to present appropriate information in order to receive bid instructions. If the loan has not bee reported delinquent, a display is presented allowing the loan to be reported to the mortgage insurer as delinquent.

Figure 5:
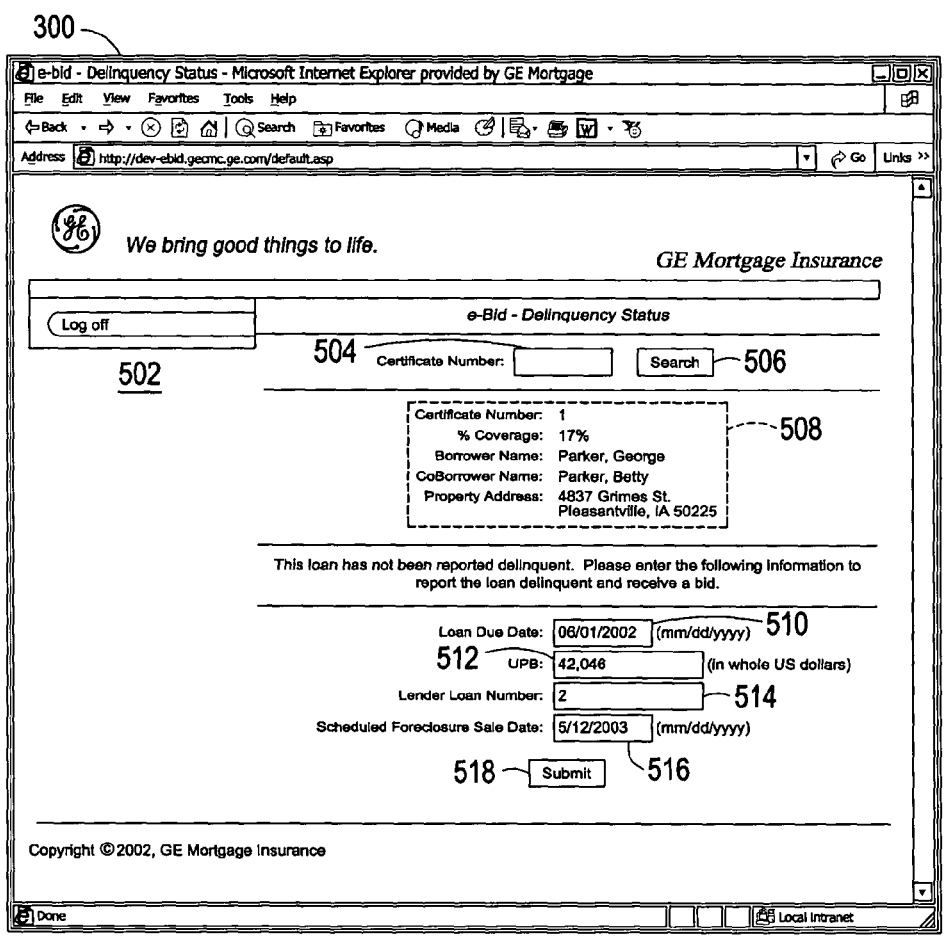

FIG. 5 illustrates the browser 300, presenting a hypertext page 502, presented if the loan for which the selected certificate was issued has not yet been reported delinquent, and used to allow the user to report the delinquency to the mortgage insurer. The page 502 includes a certificate number field 504 and a "search" button 506, in order to allow retrieval of another certificate. In such a case, the process of working with the current certificate will be aborted, and the foreclosure bid manager 118 will display the page 402. However, if the user does not submit a new certificate number, the page 502 will continue to be displayed. The page 502 further includes a certificate information display 508 and fields 510-518, to allow the user to enter the loan due date, unpaid principal balance, lender loan number and scheduled foreclosure sale date, respectively, as well as a "submit" button 518. Submitting the information reports the mortgage as delinquent, and updates the delinquency information database 114. The delinquency information may also be used to update other records maintained by the mortgage insurer operating the system 100.

Reporting the delinquency to the mortgage insurer makes it possible for the insurer to issue bid instructions. The foreclosure bid manager 118 then presents a subsequent display allowing the user to present information required to calculate a bid. If the delinquency has been previously reported to the mortgage insurer, the display 502 of FIG. 5 is not presented. Instead, the user is allowed to present the information for calculating a bid as soon as the certificate information presented in the display 402 of FIG. 4 has been accepted.

FIG. 6 illustrates the browser 300, presenting a hypertext page 602, used to allow the user to submit the information necessary to obtain a foreclosure bid for a particular property. The page 602 includes a certificate number field 604 and "submit" button 606, to allow the user to submit a new certificate. The page 602 further includes a certificate information display 608, a delinquency information display 610, and fields 612 and 614 to allow the user to submit the property value and the total debt, respectively. The page 602 also includes an entry instruction display 616, containing information to help the user determine what values to enter. If the user does not know the unpaid debt on the loan, he or she can consult the instructions in the entry instruction display 616, which provides the unpaid principal balance as of the last delinquency report, and a factor, expressed in terms of a percentage, for use in estimating the total unpaid debt. The unpaid principal balance information may suitably be taken from the mortgage information database 112, and the factor for use in estimating the unpaid debt may suitably be a predetermined value stored in a convenient repository such as the foreclosure bid database 120. A number of different factors may be used, indexed by geography or other suitable criteria, in order to provide for selection of a factor most nearly applicable to the circumstances relating to the particular loan under consideration. Once the information has been entered, it may be submitted using the "submit" button 618.

Various conditions may complicate the process of generating a bid, or may make it inappropriate for the mortgage insurer to provide bid instructions. These conditions typically have to do with cases in which the value of the property is below the value that would normally be expected. The valuation of the property is of particular concern where the value falls below the original appraisal that was performed when the loan was made.

If the property value does not fall below the original appraised value more than an acceptable degree, the foreclosure bid manager 118 generates a set of bid instructions and presents them to the user. The bid instructions are suitably prepared by extracting and processing information stored in the mortgage information database 112, the delinquency information database and the foreclosure bid database 120, as well as the information submitted by the user. The information includes the previously submitted property value and debt information, requirements of the state or other jurisdiction in which the sale is to be conducted and any regional or other variations that may be used to provide greater precision in developing a bid.

Figure 7:
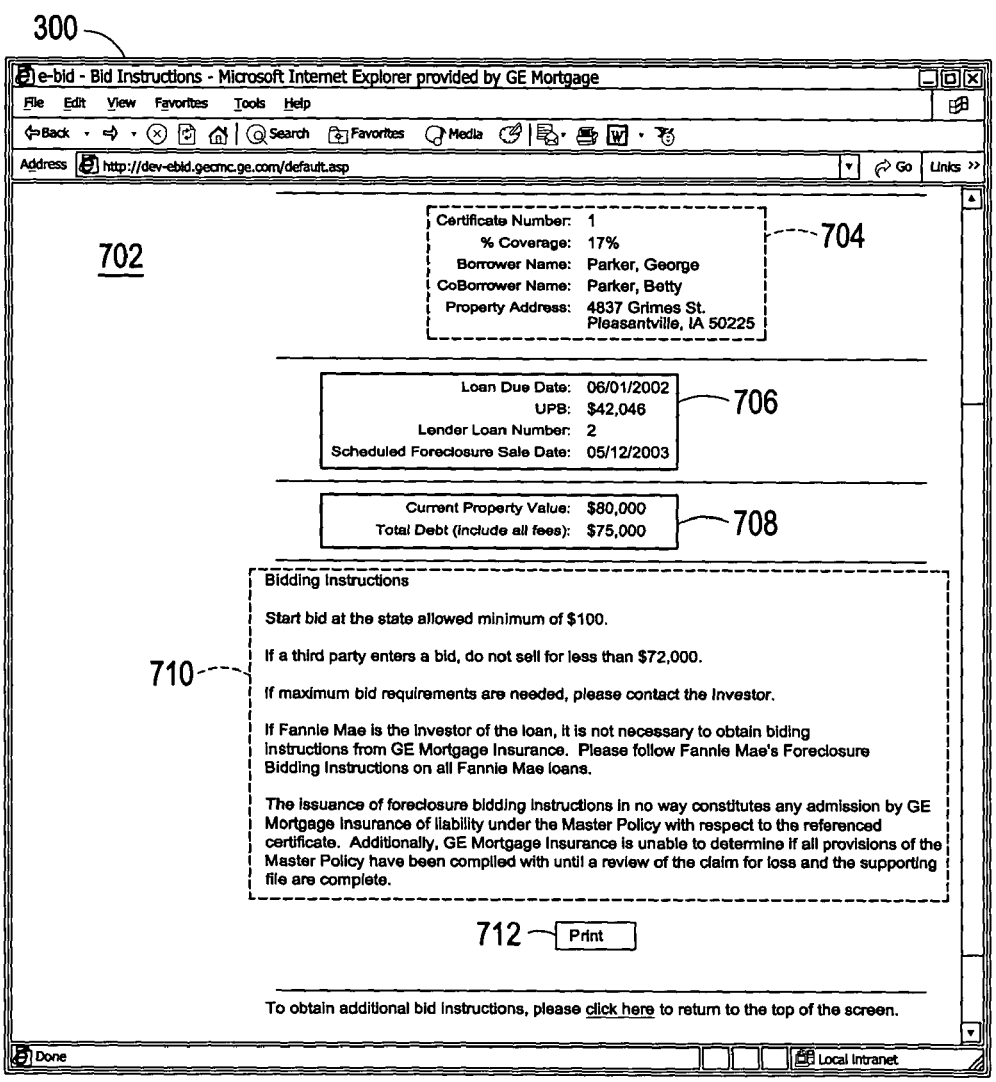

FIG. 7 illustrates the browser window 300, displaying a hypertext page 702. The page 702 includes a certificate information display 704, a delinquency information display 706, a value and debt information display 708 and a bidding instructions display 710. The bidding instructions display 710 includes a minimum bid amount, typically based on state law, and instructions if a maximum bid is required. The page 702 also includes a "print" button 712, to allow convenient printing of the bid instructions. In addition to presenting the bid instructions to a user, the foreclosure bid manager 118 suitably logs the information in a suitable repository, such as the foreclosure bid information database 120.

At the time a property was originally mortgaged, an appraisal was typically performed in order to determine the value of the property, for mortgage underwriting and mortgage insurance underwriting. If the value of a property to be foreclosed falls below the original appraised value by more than a predetermined degree, further inquiry is required in order to explain the deviation from standards. This allowable deviation may suitably be expressed in terms of a percentage, and may be extracted from the foreclosure bid information database 120. If an excessive deviation exists, an inquiry page is presented to allow the user to explain the reason for the deviation.

FIG. 8 illustrates the browser window 300, displaying a hypertext page 802. The page includes an instruction display 804, requesting the user to indicate the reason for the deviation. Checkboxes 806, 808, 810 and 812 are also included to allow the user to indicate whether the reason for the deviation was damage to the property, a depreciating area, an unknown reason or another reason, respectively. If the box 812 is selected, indicating that the reason is "other," the user preferably types an explanation into a "comments" box 814. If desired, explanatory information may be entered into the box 814 no matter which of the checkboxes is selected. Once the user has made the desired entries, he or she then activates the "submit" button 816. The information is received by the foreclosure bid manager 110, which constructs a message to an appropriate department of the mortgage insurer and transmits the message. The foreclosure bid manager 118 also logs the deviation information in a suitable repository, such as the delinquency information database 114.

If the reason for a value deviation is that the property is damaged, the rules of the mortgage insurer may provide that the insurer will not issue bid instructions. Typically, a mortgage insurer covers market risks, and is not equipped to evaluate loss in value due to property damage.

Figure 9:
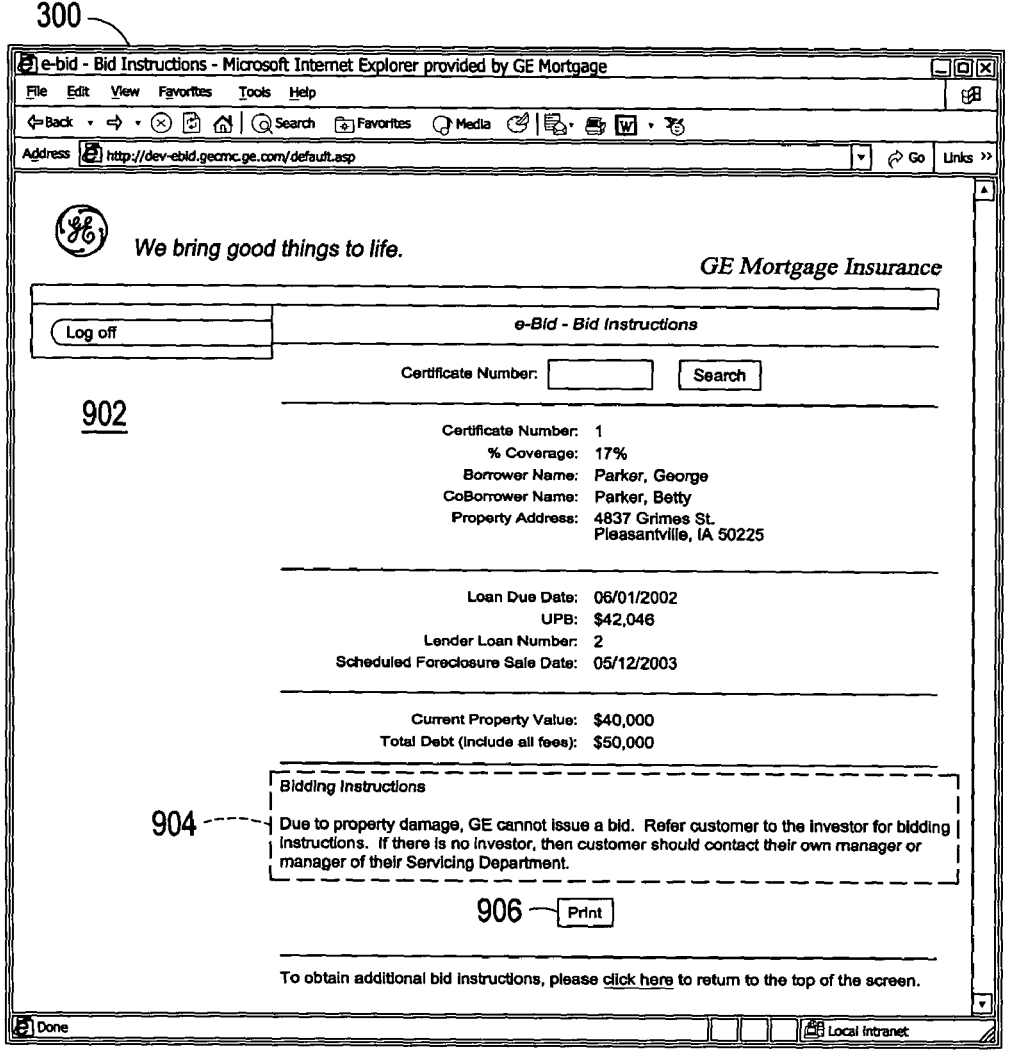

FIG. 9 illustrates the browser 300, displaying a hypertext page 902, showing an instruction display 904. The instruction display 904 instructs the user that the mortgage insurer will not provide bid instructions, and request that appropriate parties be consulted in order to determine the bid. The page 902 also includes a "print" button 906 for printing of the instructions.

Other conditions may exist that cause the property value to deviate from the original appraised value. Some of these conditions fall within the risks covered by mortgage insurance. In these cases, it may be appropriate for the mortgage insurer to furnish bidding instructions. For example, if the market value of the area where a property is located begins to depreciate, this depreciating condition is a market condition and falls within the risks covered by mortgage insurance. FIG. 10 illustrates the browser window 300 displaying the page 1002. The page 1002 is similar to the page 802, but in this case a "depreciating area" box 1004 is checked.

Figure 11:
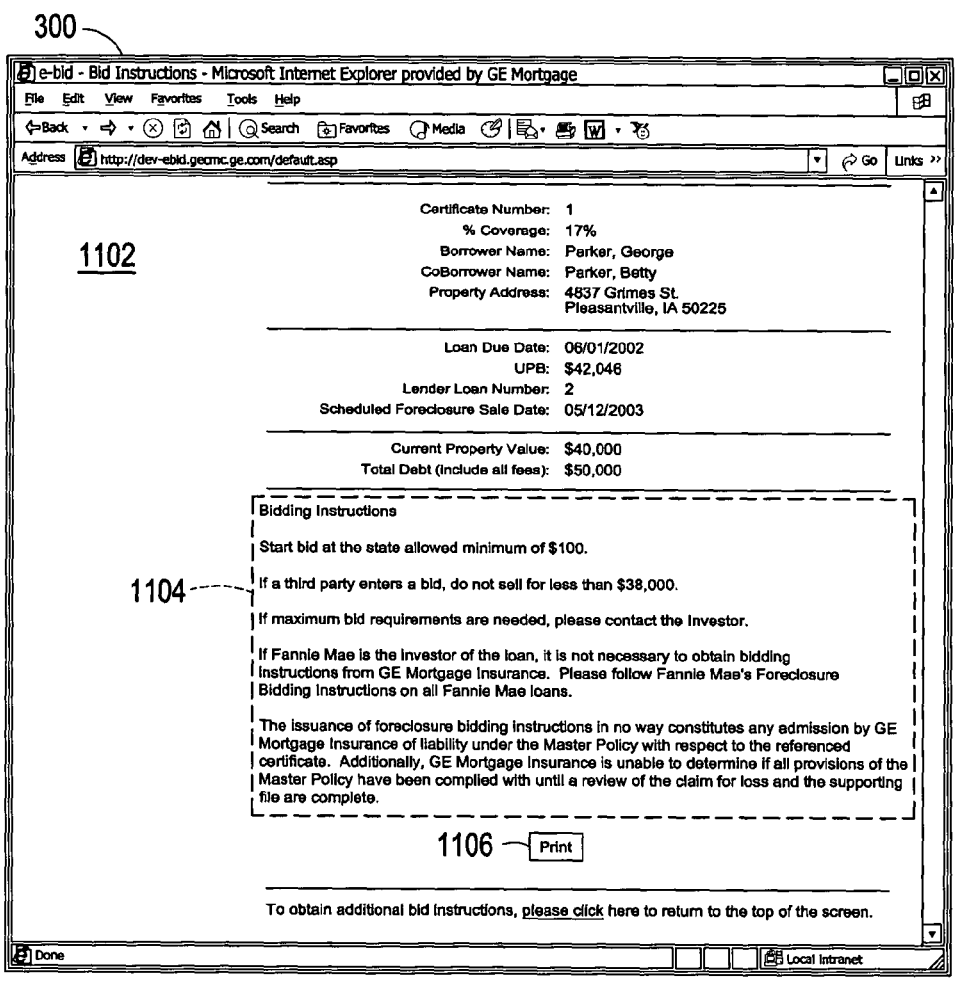

FIG. 11 illustrates the browser window 300, displaying a hypertext page 1102 containing a bidding instructions display 1104 for the property presented in the page 1002. Computation of the bidding amount takes into account the valuation of the property, and the total debt.

FIG. 12 illustrates a process of foreclosure bid generation and display according to an aspect of the present invention. At step 1202, upon a connection by a user to an electronic data processing system used to store and process mortgage loan information and submission and authentication of user identifying information, a welcome page is presented allowing the user to submit loan identifying information in order to retrieve information for a mortgage loan in order to generate a foreclosure bid for the loan. The user identifying information typically identifies the user as an employee of a specific loan servicing entity, and gives the user access to information relating to loans associated with that entity. The loan identifying information may suitably be a certificate number entered by the user, or alternatively may be a selection from a list of loans managed by the mortgage insurer or servicing entity associated with the user's identifying information. At step 1204, the loan identifying information submitted by the user is examined and a determination is made in order to decide whether the user has authorized access to the loan information. If the user does not have authorized access, the process proceeds to step 1250 and an error message is presented. In addition, a message may suitably be transmitted to an appropriate destination in order to provide an alert of a possible attempt at a security breach. The process then returns to step 1202. If the user does have authorized access to the loan information, the process proceeds to step 1206 and the loan information associated with the identifier is presented for verification. Upon verification by the user, the process proceeds to step 1208 and an examination is made of stored information associated with the loan to determine if the loan has been reported delinquent. If the loan has been reported delinquent, the process skips to step 1212. If the loan has not been reported delinquent, the process proceeds to step 1210 and the user is presented with a form allowing submission of delinquency information. Upon submission of the delinquency information by the user, the process proceeds to step 1212.

At step 1212, the user is presented with a form allowing submission of unpaid debt and valuation information, or other information used to obtain a foreclosure bid. At step 1214, upon submission of the information, additional information related to the loan and foreclosure is retrieved and examined along with the submitted information. The retrieved information may suitably include state rules governing foreclosure bid sales, original property appraisal information, parameters defining acceptable deviations between the present value of the property and the original appraisal and other information for determining whether a bid is to be computed and to determine if an unusual situation exists for which an alert needs to be issued. At step 1216, the retrieved information and the submitted information is examined and evaluations are made in light of the retrieved and submitted information. If a comparison between the submitted information and the retrieved information does not present notable anomalies, most particularly a substantial shortfall in the present value of the property as compared to the original appraised value, the process proceeds to step 1280 and a foreclosure bid is prepared and presented, using rules calculated to generate a bid amount likely to produce the appropriate net proceeds from the sale, taking into account the value of the property and the total debt. Next, at step 1282, the foreclosure bid amount is logged, suitably in a delinquency information database entry storing information about the delinquency status of the loan in question, as well as a mortgage information database entry storing general information about the loan.

Returning now to step 1216, if a comparison between the submitted information and the retrieved information presents anomalies, the process proceeds to step 1218 and additional information is requested, in order to explain the anomalies that have been noted. The requested information may suitably be an explanation for any deviations between the present value of the property and the original appraised value, and the user may be requested to provide information indicating that the property is in a damaged condition, that it is in a depreciating area, or other explanation or comments explaining the anomalies. Upon submission of the requested information, the process proceeds to step 1220 and the requested information is examined. If the information indicates conditions such that a bid cannot be computed, the process proceeds to step 1222 and the user is informed that no bid can be provided. In addition, appropriate logs are updated, such as a delinquency information database record and a mortgage information database record, and suitable alerts may be issued. The process then returns to step 1202, in order to allow the user to submit information for additional loans.

At step 1280, a foreclosure bid is generated and a set of instructions is displayed for the user, based on the information submitted by the user and the retrieved information. The bid amount is suitably determined based on the property valuation and total debt information, together with any adjustments due to conditions affecting the valuation and for which alerts may have been issued at step 1222. Once a foreclosure bid has been issued, the process returns to step 1202, to allow the user to submit information for additional properties and obtain additional bids.

While the present invention is disclosed in the context of aspects of a presently preferred embodiment, it will be recognized that a wide variety of implementations may be employed by persons of ordinary skill in the art consistent with the above discussion and the claims which follow below.

The invention claimed is:

1. A system for computing and presenting a foreclosure bid on behalf of a holder of a secured loan at a foreclosure sale of property securing the secured loan, comprising:

a foreclosure bid information database receiving, storing and maintaining foreclosure bid information applicable to foreclosure sales of property, the foreclosure bid information being relevant to determination of a foreclosure bid likely to yield maximum net proceeds from the sale of the property and including information relating to the rules and laws of plural jurisdictions that govern foreclosure bidding;

a foreclosure bid manager accessible to a user through a publicly available data processing network, the foreclosure bid manager computing foreclosure bid information for a user for preparation of a bid that may be entered on behalf of the holder of the secured loan, the foreclosure bid manager receiving inputs from a user relating to a property for which a foreclosure sale is to be held and employing information submitted by the user and stored in the foreclosure bid information database to compute an appropriate bid for the property, to compile a set of bid instructions consistent with the rules and laws which are applicable thereto and including a minimum price to allow for the property the minimum price being a price calculated to yield maximum net proceeds from the property, and to present the bid instructions to the user; and a mortgage information database including information relating to mortgages covered by certificates of mortgage insurance, said information comprising a mortgage insurance certificate number and a delinquency information database and wherein the foreclosure bid manager retrieves loan and delinquency information for a loan associated with a particular mortgage insurance certificate number submitted by the user and processes the information submitted by the user together with the loan and delinquency information and the foreclosure bid information to create foreclosure bid instructions.

2. The system of claim 1, wherein the foreclosure bid manager retrieves and examines loan and delinquency information upon receiving an identifier to determine whether or not the loan has been reported delinquent and, if the loan has not been reported delinquent, to present an interface to the user allowing the user to submit delinquency information for the loan.

3. The system of claim 2, wherein the foreclosure bid manager logs foreclosure bid information upon the generation and presentation of a foreclosure bid.

4. The system of claim 3, wherein the foreclosure bid manager examines the retrieved and user submitted information for anomalies and provides appropriate alerts and messages if anomalous conditions are detected.

5. The system of claim 4, wherein the foreclosure bid manager requests additional information from the user upon determination that an anomalous condition exists.

6. The system of claim 5, wherein the foreclosure bid manager determines whether the presence of an anomalous condition precludes the generation of bid instructions.

7. The system of claim 6, wherein the foreclosure bid manager examines identification submitted by a user and limits access by the user to loan and foreclosure information associated with the identification submitted by the user.

8. The system of claim 7, wherein the foreclosure bid information includes bidding rules relating to jurisdictions in which foreclosure sales may be held and wherein the foreclosure bid manager retrieves and applies appropriate rules in generating bid instructions.

9. The system of claim 8, wherein the foreclosure bid information includes foreclosure fee and expense information.

10. A method of foreclosure bid generation and presentation, comprising the steps of:
    establishing a connection to a user computer through a data processing network;
    receiving loan identification information from the user;
    retrieving foreclosure bid information relating to the loan from a foreclosure bid information database storing information relating to the rules and laws of plural jurisdictions that govern foreclosure bidding;
    receiving loan information from the user relevant to generating a foreclosure bid to be entered on behalf of a holder of a secured loan for a property securing the loan;
    processing the information received from the user and the retrieved foreclosure bid information and computing a foreclosure bid amount calculated to yield maximum net proceeds from the sale of the property utilizing a computer based foreclosure bid manager;
    generating a set of foreclosure bid instructions consistent with the rules and laws which are applicable thereto for bidding for the property at a foreclosure sale, the set of foreclosure bid instructions including the computed foreclosure bid amount;
    presenting the set of foreclosure bid instructions to the user over a data processing network interface; and
    retrieving loan and delinquency information associated with a mortgage insurance certification number and relating to the loan and wherein the step of processing the information received from the user includes processing the retrieved loan and delinquency information along with the loan information and retrieved foreclosure bid information.

11. The method of claim 10, further including a step of examining the retrieved loan and delinquency information in order to determine if the loan has been reported as delinquent and, if not, to present a query to the user allowing the user to report delinquency information for the loan.

12. The method of claim 11, wherein the step of generating the foreclosure bid instructions is followed by a step of logging the foreclosure bid instructions.

13. The method of claim 12, wherein the step of receiving the loan information from the user is followed by a step of examining the retrieved loan and delinquency information and the retrieved loan information in order to determine if anomalous conditions exist relating to the property, and of presenting an inquiry to the user asking for further explanation of the anomalous conditions.

14. The method of claim 13, further including a step of logging the existence of anomalous conditions and producing appropriate alerts relating to the anomalous conditions.

15. The method of claim 14, further including a step of examining the anomalous conditions to determine if the conditions are such that no foreclosure bid instructions should be generated and, if so, presenting an appropriate notification to the user as well as generating log entries and alerts.

16. The system of claim 9, wherein the foreclosure bid information includes a predetermined allowable deviation from an original appraised value before investigation is required.

17. The method of claim 10 wherein the foreclosure bid information database is updated periodically.

18. The method of claim 17 wherein said periodic updating of the foreclosure bid information database updates foreclosure fee and expense information; and
    a predetermined allowable deviation from an original appraised value before investigation is required.

* * * * *